(12) United States Patent
Tosato et al.

(10) Patent No.: US 7,653,153 B2
(45) Date of Patent: Jan. 26, 2010

(54) QAM RECEIVER AND METHOD FOR CONSTELLATIONS HAVING AT LEAST SIXTEEN SYMBOLS

(75) Inventors: Filippo Tosato, Abano Terme (IT); Paola Bisaglia, Padua (IT)

(73) Assignee: Hewlett-Packard Development Company, L.P., Houston, TX (US)

(*) Notice: Subject to any disclaimer, the term of this patent is extended or adjusted under 35 U.S.C. 154(b) by 1171 days.

(21) Appl. No.: 10/440,399

(22) Filed: May 19, 2003

(65) Prior Publication Data

US 2004/0091058 A1 May 13, 2004

(30) Foreign Application Priority Data

May 17, 2002 (GB) .................. 0211492.4

(51) Int. Cl.
*H04L 27/06* (2006.01)
(52) U.S. Cl. ...................... 375/341; 375/346
(58) Field of Classification Search .......... 375/340–343
See application file for complete search history.

(56) References Cited

U.S. PATENT DOCUMENTS

| | | | | |
|---|---|---|---|---|
| 5,134,635 | A * | 7/1992 | Hong et al. ................. | 375/341 |
| 6,078,626 | A | 6/2000 | Ramesh | |
| 6,115,435 | A * | 9/2000 | Harada et al. ............... | 375/262 |
| 6,243,423 | B1 * | 6/2001 | Sakoda et al. ............... | 375/341 |
| 6,377,607 | B1 * | 4/2002 | Ling et al. .................. | 375/130 |
| 6,594,318 | B1 * | 7/2003 | Sindhushayana ............ | 375/262 |
| 6,977,972 | B1 * | 12/2005 | Kandala et al. ............. | 375/332 |
| 6,980,602 | B1 * | 12/2005 | Kleinerman et al. ........ | 375/262 |
| 7,076,000 | B2 * | 7/2006 | Rodriguez .................. | 375/262 |
| 2002/0037057 | A1 | 3/2002 | Kroeger et al. | |
| 2003/0185319 | A1 * | 10/2003 | Kolze ......................... | 375/347 |

OTHER PUBLICATIONS

Ström, "Notes on Quadrature Amplitude Modulation," Document No. ESS140/ext:10, rev.: A, Oct. 22, 2003, 12 pp.
"Performance Analysis of QAM," http://www.ece.utexas.edu/~bevans/courses/realtime/lectures/15_QAM/lecture15/node4.html, May 17, 2003.
"Performance Analysis of PAM," http://www.ece.utexas.edu/~bevans/courses/realtime/lectures/15_QAM/lecture15/node3.html, May 17, 2003.
"Phase Shift by 90 degrees," http://www.ece.utexas.edu/~bevans/courses/realtime/lectures/15_QAM/lecture15/node2.html, May 17, 2003.
"Average Power Analysis," http://www.ece.utexas.edu/~bevans/courses/realtime/lectures/15_QAM/lecture15/node5.html, May 17, 2003.
Zehavi, "8-PSK Trellis Codes for a Rayleigh Channel," *IEEE Transactions on Communications*, pp. 873-894, May 1992, vol. 40, No. 5.
Speth et al., "Low Complexity Space-Frequency MLSE for Multi-User COFDM," *Global Telecommunications Conference—Globecom '99*, pp. 2395-2399, 1999, IEEE.
Ryndiah et al., "Near Optimum Decoding of Product Codes," pp. 339-343, 1994, IEEE.
Tosato et al., "Simplified Soft-Output Demapper for Binary Interleaved COFDM with Application to HIPERLAN/2," pp. 664-668, IEEE, 2002.

* cited by examiner

*Primary Examiner*—Jason Perilla (57) ABSTRACT

A QAM receiver for constellations having at least 16 symbols converts its received QAM signal into outputs including indications of the received symbols. A channel frequency response estimator responsive to outputs of the converter derives indications of estimates of effects of a link to the receiver on the phase and amplitude of the received signals. A processor responsive to outputs of the converter and the estimator (1) equalises the phases of the converter outputs, (2) scales the amplitude estimates by amounts determined by the amplitude associated with the separation of boundaries between symbols in the constellation, and (3) combines the phase equalised converter outputs and the scaled amplitude estimates to derive likely bit values of the received symbols.

16 Claims, 7 Drawing Sheets

QAM RECEIVER AND METHOD FOR CONSTELLATIONS HAVING AT LEAST SIXTEEN SYMBOLS

RELATED APPLICATION

The present application is based on, and claims priority from, GB Application Number 0211492.4, filed May 17, 2002, the disclosure of which is hereby incorporated by reference herein in its entirety.

FIELD OF THE INVENTION

The present invention relates to a method of estimating a reliability measurement for a received bit of a quadrature amplitude modulated (QAM) symbol. The present invention also relates to a receiver and demapper operating in accordance with the method.

BACKGROUND ART

A significant amount of effort has been expended in the development of high data rate digital communication. Such communication technologies have brought about wireless local area networks, such as those defined in IEEE802.11a and HIPERLAN/2.

Reducing the computational complexity in the receivers of such a network would be beneficial for implementation of such systems because of the limited resources available in many low cost commercial devices.

Figures 1, 2:
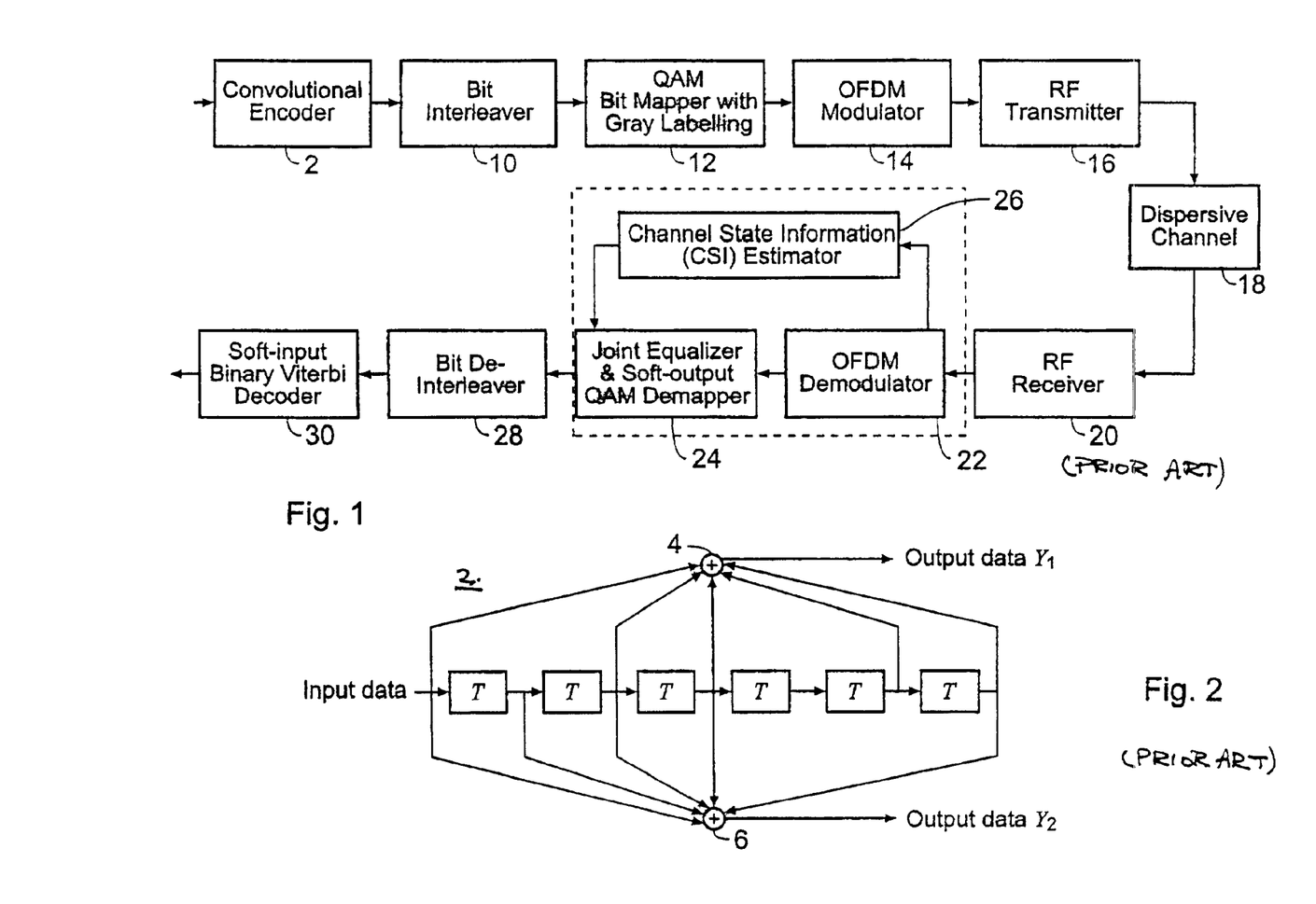
FIG. 1, as previously described, is a block diagram including a transmit path and a receive path for a bit interleaved coded modulation scheme.
FIG. 2, as previously described, is a block diagram of a convolutional encoder included in a transmitter of FIG. 1.

FIG. 1 is a block diagram of a communication system wherein the present invention can be applied. The transmitter part including encoder 2, interleaver 10, bit mapper 12, modulator 14 and transmitter 16 is in accordance with the HIPERLAN/2 and 802.11a standards. In both of these standards different quadrature amplitude modulation (QAM) formats are used, such as bi-phase shift key (BPSK), quadrature phase shift key (QPSK), 16 QAM and 64 QAM.

In general a first user (which may be human or machine) wishes to transmit a data stream to a second user. The bits in the data stream are firstly convolutionally encoded by an encoder 2 to provide forward error correction. Schemes for convolutional encoding are well known to the person skilled in the art and hence only a brief description is required here. In general convolutional encoding is performed by shifting the data through a chain of delay elements usually implemented as a shift register. In the case of the HIPERLAN/2 and 802.11a standards the convolutional code has a rate ½ and a constraint length of seven.

The chain, as shown in FIG. 2, includes taps at various points. The tapped signals are summed together by summers 4 and 6 which are implemented as modulo 2 adders, which are often physically realised as a cascade of exclusive—OR gates.

The arrangement shown in FIG. 2 has six delay elements T and data can also be tapped off at the input to the first element. The encoder shown has, in effect, seven snapshots of the input string and is therefore described as having a constraint length of 7.

The encoder 2 produces two data outputs $Y_1$ and $Y_2$ in accordance with the series of connections and taps that are formed within it. Working from the input to the output, the first output is represented by the first, the third, fourth, sixth and seventh taps, or 1011011. The second output $Y_2$ is represented by 1111001. Thus the code generator for this encoder is [133, 171] in octal format. Because the convolutional code has rate ½ the data entering the encoder 2 is a scalar bit stream, while the data leaving the encoder is a stream of binary bit pairs. The data outputs of the encoder 2 are sent to a bit interleaver 10 which spreads the bits so that potential errors caused by channel degradation are seen as independent at the receiver. The interleaved bits are then converted into quadrature-amplitude modulated (QAM) signals by QAM mapper 12 having Gray code labelling.

In other words, bit interleaver 10 and bit mapper 12 cause sequences of 2 m bits to be assigned to one of the $M=2^{2m}$ points in the QAM constellation. The mapping is performed as a Gray coding such that sequences of bits associated with adjacent symbols only differ by one bit.

Figure 3:
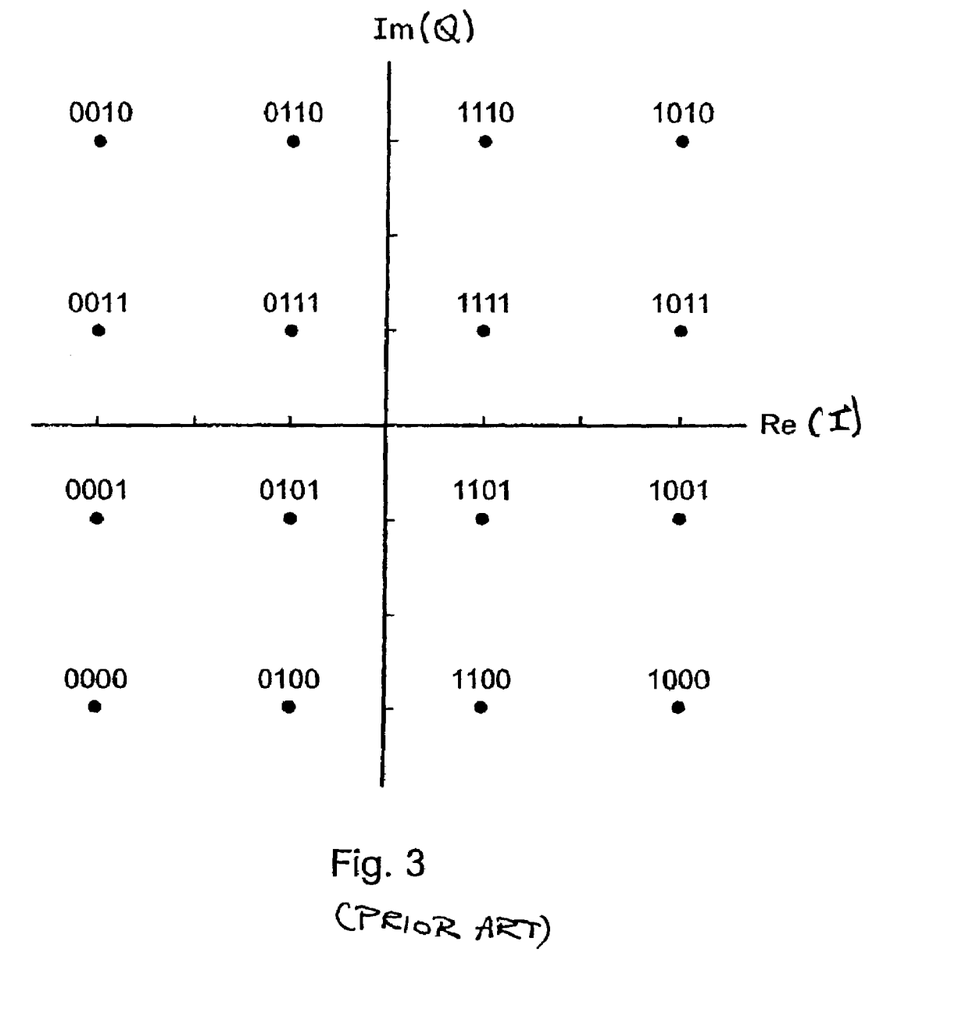
FIG. 3, as previously described, is a drawing representing a square 16 QAM constellation.

An exemplary 16-QAM constellation, where m=2, based on the foregoing, is shown in FIG. 3.

Bit mapper 12 feeds the complex (real and imaginary parts) signals to orthogonal frequency division multiplexing (OFDM) modulator 14. OFDM is a multi-carrier modulation process that subdivides the frequency spectrum that it uses into a plurality of channels. The process gives good performance over a dispersive transmission path. The data stream is split into $N_{sd}$ lower rate data streams that are transmitted over $N_{sd}$ sub-carriers. The symbol duration increases for the parallel sub-carriers and hence the transmission scheme is more robust in the presence of multi-path interference.

Finally the signal is transmitted by a radio frequency transmitter 16 such that the radio signal propagates via a transmission channel 18 (that in many instances tends to be dispersive and noisy) to a receiver 20. Receiver 20 includes an automatic gain control (AGC) circuit to assure that the receiver average output amplitude is normalised.

Consider the performance of a generic $i_{th}$ sub-carrier used in the OFDM process. The $i_{th}$ channel carries a series of QAM symbols. If we consider just one of these symbols, then $$\alpha[i]=\alpha_I[i]+j\alpha_Q[i] \qquad (1)$$

Where
$\alpha[i]$ represents the symbol in the $i_{th}$ sub-carrier
$\alpha_I[i]$ represents the real component of symbol $\alpha[i]$
$\alpha_Q[i]$ represents the imaginary component of symbol $\alpha[i]$, and,
j represents the imaginary operator, i.e., $\sqrt{-1}$.

Each symbol represents a convolutionally encoded bit sequence given by $\{b_{I,1}; b_{I,2} \ldots ; b_{I,m}; b_{Q,1}; b_{Q,2}; \ldots b_{Q,m}\}$, as shown in FIG. 3 for a 16 QAM constellation.

The output of the receiver 20 drives OFDM demodulator 22 whose output is fed to an analog to digital converter (not shown) that drives an equalizer and soft-output QAM demapper 24. Assuming that the cyclic prefix, introduced by the OFDM modulator 14, completely eliminates ISI (Inter OFDM Symbol Interference) and ICI (Inter Channel Interference) and that the channel estimate is error free, the received equalised signal in the $i_{th}$ sub-carrier is given by:

$$y[i]=r[i]/G_{ch}(i)=a[i]+w[i]/G_{ch}(i) \qquad (2)$$

Where
r[i] is the received signal before equalization at the output of the OFDM demodulator 22 in the $i_{th}$ sub-carrier,
$G_{ch}(i)$ is the Channel Frequency Response (CFR) coefficient (a complex number) in the $i_{th}$ sub-carrier, and
w[i] is the complex Additive White Gaussian Noise (AWGN).

The de-mapper 24 also receives information from a channel state information (CSI) estimator 26, responsive to an output of demodulator 22. The CSI estimator 26 attempts to deduce, i.e., estimate, the effect of the transmission path of channel 18 on the signal propagating in the channel.

In broad terms channel 18 both scales the QAM signals and rotates them in phase, i.e., the QAM constellation gets rotated. The CSI estimator 26 attempts to estimate the effect of the channel 18 on the symbol. The CSI estimator can work on the assumption that channel 18 is slowly time variant. However, the physical transmission scheme includes "preambles" which contain known sequences of symbols that can be used to estimate the status of channel 18. Thus estimator 26 derives individual phase and modulus estimates for each channel 18 by identifying the preamble.

The output of the demapper 24 drives de-interleaver 28, which in turn drives a convolutional decoder 30, that typically decodes based on the Viterbi algorithm. The Viterbi algorithm of decoder 30 searches the possible code words of the convolutional code and detects the one that is most likely to have generated the received sequence. The search procedure of decoder 30 steps through the code trellis and for each path along the trellis computes a metric which quantifies the discrepancy between the received sequence and the possible coded sequence. If the information associated with bits fed into the decoder is hard (i.e., binary, a sequence of −1's and 1's) the decoder 30 is called a hard decision decoder. Alternatively, if the information is soft, consisting of a hard decision (the sign, i.e., polarity) and a confidence level, or reliability (the magnitude), that represents how much confidence there should be in the hard-decision, the decoder 30 is called a soft-decision decoder. It is well known that soft decision Viterbi decoding can give significant gain over hard decoding at the expense, however, of a greater computational complexity. In order to implement a soft-decision Viterbi decoder, the demapper 24, which precedes the Viterbi decoder 30, needs to deliver soft information associated with the bits.

Soft decision demapping for bit interleaved coded modulation (BICM) signals with BPSK or QPSK modulations is straightforward as the soft bit information, before being weighted by the Channel State Information (CSI), is simply given by the received signals for BPSK and by their quadrature-phase and quadrature components for QPSK. Therefore in the following discussion, consideration is given to the higher modulation formats, for which soft detection requires much more computational effort.

In the literature, two different approaches can be found to calculate the soft information for BICM signals, with multi-level modulations.

One prior art mechanism for bit interleaved coded modulation (BICM) schemes was disclosed by E. Zehavi, "8-PSK Trellis Codes for a Rayleigh Channel" IEEE Trans on Comm, Vol 40, pp 873-884, May 1992. The process starts by calculating sub-optimal bit metrics that are then used inside a Viterbi decoder for path metric computation.

For each bit $b_{I,K}$ and each bit $b_{Q,K}$ (where I and Q represent in-phase and quadrature parts, respectively, and K represents an index of the bit associated with the symbol, where K is an integer in the range $1 \leq K \leq m$) the QAM constellation is split into two partitions of complex symbols.

These partitions are $S_{I,K}^{(0)}$ having symbols with a 0 in position I, K.
$S_{I,K}^{(1)}$ having symbols with a 1 in the position I, K.
$S_{Q,K}^{(0)}$ having symbols with a 0 in position Q, K.
$S_{Q,K}^{(1)}$ having symbols with a 1 in position Q, K.

The bit metrics are given by $$M_C(b_{I,K}) = |G_{CH}(i)|^2 \cdot \min|y[i] - \alpha|^2, c = 0,1 \qquad (3)$$

-continued
$$\alpha \in S_{I,K}^{(c)}$$

Finally the metrics are de-interleaved by a de-interleaver 28 and provided as an input to a Viterbi decoder 30.

The Viterbi decoder 30 works according to a well known algorithm which need not be described in detail here. However various web sites give tutorials in Viterbi decoding, such as http://pweb.netcom.com/~chip.f/viterbi/algrthms2.html.

The convolutional encoder 2 functions as a state machine and the Viterbi decoder 30 is furnished with a state map of the state machine showing which state to state transitions are allowed and which ones are disallowed.

In the second prior art approach, the QAM symbols are first demodulated by a soft output de-mapper and passed to a soft-input Viterbi decoder; see M. Speth et al, "Low Complexity Space-Frequency MLSE for Multi-User COFDM", IEEE GLOBECOM '99, pp 2395-99, December 1999.

In this approach the process seeks to de-map the received signal into soft bits which have the same sign as that provided by a hard decoder and whose magnitude indicates the reliability of the decision.

The soft bit information assigned to bit $b_{I,K}$ can be shown to be given by the log-likelihood ratio (LLR) of the hard decision on $b_{I,K}$ (see R. Pyndiah et al "Near Optimum Decoding of Product Codes", IEEE GLOBECOM 94, pp 339-43, November-December, 1994) and can be approximated by $$LLR(b_{I,K}) = \left|\frac{G_{CH}(i)}{4}\right|^2 \{\min|y[i] - \alpha|^2 - \min|y[i] - \alpha|^2\} \qquad (4)$$

$$\{\alpha \in S_{I,K}^{(0)} \qquad \alpha \in S_{I,K}^{(1)}\}$$

$$LLR(b_{I,K}) \underline{\Delta} |G_{CH}(i)|^2 \cdot D_{I,K} \qquad (5)$$

We define $$S'^{(c)}_{I,K} \overset{\Delta}{=} \mathcal{R}\{S_{I,K}^{(c)}\}$$

as the subset containing the real parts of the complex symbols of subset $S_{I,K}^{(c)}$, for c=0.1. It can be shown that equation (4) can be rewritten in a simpler form, $$LLR(b_{I,K}) = \left|\frac{G_{CH}(i)}{4}\right|^2 \{\min(y_I[i] - \alpha_I)^2 - \min(y_I - \alpha_I)^2\} \qquad (6)$$

$$\{\alpha_I \in S'^{(0)}_{I,K} \qquad \alpha_I S'^{(1)}_{I,K}\}$$

Where the two minima are now taken over real values instead of complex symbols.

If this is, for convenience, explicitly evaluated for the 16 QAM symbols we have $$\begin{aligned} & y_I[i] && |y_I[i]| \leq 2 \\ D_{I,1} = \, & 2(y_I[i] - 1) && y_I[i] > 2 \\ & 2(y_I[i] + 1) && y_I[i] < 2 \end{aligned} \qquad (7)$$

$$D_{I,2} = -|y_I[i]| + 2.$$

Equivalent expressions hold for the quadrature components with "I" replaced by "Q".

It has been demonstrated in F. Tosato and P. Bisaglia "Simplified Soft-Output Demapper for Binary Interleaved COFDM with Application to HIPERLAN/2", IEEE ICC 2002, April-May, 2002, that using the approximate bit metrics $M_C(b_{I,K})$ in equation 3 for path metric calculation inside the Viterbi algorithm is equivalent to demodulating the signals into soft bit values according to equation 6 and then employing a soft Viterbi algorithm for decoding.

The formula for calculating the log likelihood ratio in equation 6 can be further approximated by calculating $|D_{I,K}|$ (or indeed $|D_{Q,K}|$) as the distance of the received equalised signal y[i] from the nearest partition boundary within the partitioned QAM space and assigning $D_{I,K}$ (or $D_{Q,K}$ as appropriate) the sign "+" or "−" according to the partition in which y[i] falls. The magnitude (i.e., absolute value) is a measure of distance of the received symbol from the decision boundary.

Figure 4A:
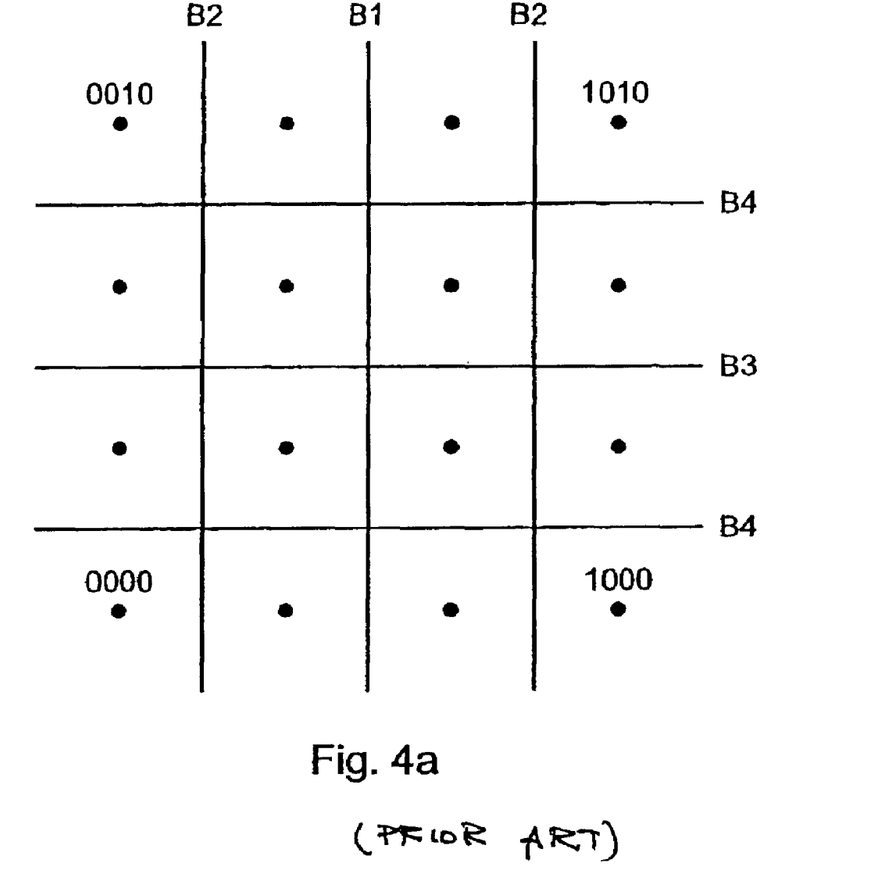
FIG. 4a, as previously described, is a drawing representing the partition boundaries of the 16 QAM space of the constellation of FIG. 3.

FIG. 4a is an illustration of the decision boundaries B1 to B4 for 16 QAM modulation and FIGS. 4b to 4e are illustrations of the resulting partitions in 16 QAM space.

Figure 4B:
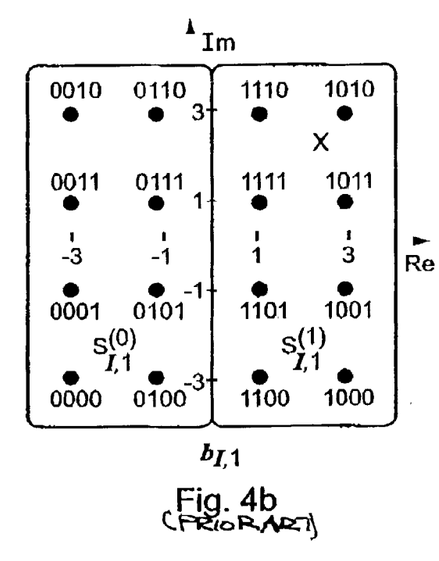
FIGS. 4b to 4e, as previously described, are drawings representing the resulting partitions of the 16 QAM space of the constellation of FIG. 3.

FIG. 4b indicates the partitions $S_{I,1}^{(0)}$ and $S_{I,1}^{(1)}$ in the I axis direction for the left most bits in the symbols of FIG. 4a, i.e., for bits $b_{I,1}$. Partition $S_{I,1}^{(0)}$ thus includes symbols having left most bits having 0 values while partition $S_{I,1}^{(1)}$ includes symbols having left most bits having 1 values. Each of partitions $S_{I,1}^{(0)}$ and $S_{I,1}^{(1)}$ has the same area and includes two columns of four symbols, on opposite sides of the Q axis.

Figure 4C:
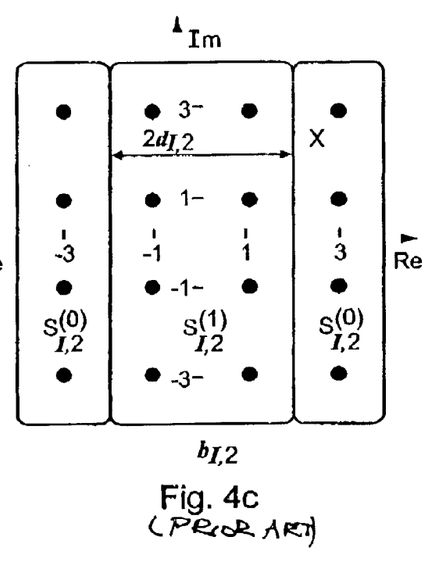

FIG. 4c indicates the partitions $S_{I,2}^{(0)}$ and $S_{I,2}^{(1)}$ in the I axis direction for the second to the left bits in the symbols of FIG. 4a, i.e., for bits $b_{I,2}$. Partition $S_{I,2}^{(0)}$ includes two separate parts and includes symbols having second to the left bits with 0 values while partition $S_{I,2}^{(1)}$ includes symbols having second to the left bits with 1 values. Partition $S_{I,2}^{(1)}$ is bisected by the Q axis and includes two columns of four symbols on opposite sides of the Q axis. One of partitions $S_{I,2}^{(0)}$ is on the right side of partition $S_{I,2}^{(1)}$ while the other $S_{I,2}^{(0)}$ partition is on the left side of partition $S_{I,2}^{(1)}$. Each of partitions $S_{I,2}^{(0)}$ includes a single column of four symbols.

Figure 4D:
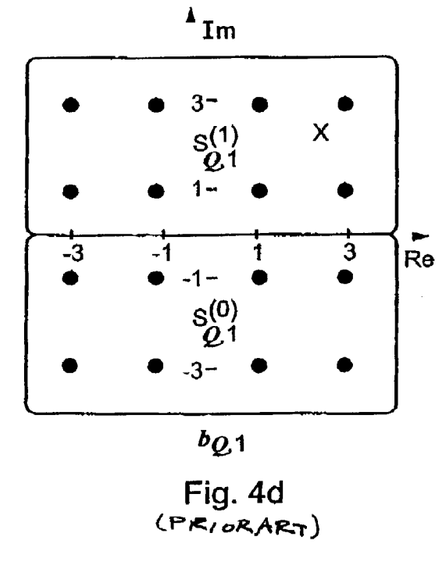

FIG. 4d indicates the partitions $S_{Q,1}^{(0)}$ and $S_{Q,1}^{(1)}$ in the Q axis direction for the third to the left bits in the symbols of FIG. 4a, i.e., for bits $b_{Q,1}$. Partition $S_{Q,1}^{(0)}$ includes symbols having third to the left bits with 0 values while partition $S_{(Q),1}^{(1)}$ includes symbols having third to the left bits with 0 values. Each of partitions $S_{Q,1}^{(0)}$ and $S_{Q,1}^{(1)}$ has the same area and includes two rows of four symbols on opposite sides of the I axis.

Figure 4E:
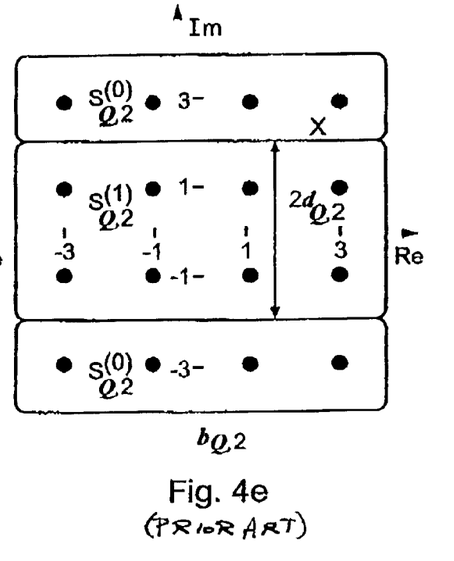

FIG. 4e indicates the partitions $S_{Q,2}^{(0)}$ and $S_{Q,2}^{(1)}$ in the Q axis direction for the right most bits in the symbols of FIG. 4a, i.e., for bits $b_{Q,2}$. Partition $S_{Q,2}^{(0)}$ has two separate parts and includes symbols with the right most bit having 0 values, while $S_{Q,2}^{(1)}$ includes symbols with the right most bit having 1 values. Partition $S_{Q,2}^{(1)}$ is bisected by the I axis and includes two rows of four symbols. One of partitions $S_{Q,2}^{(0)}$ is above partition $S_{Q,2}^{(1)}$, while the other partition $S_{Q,2}^{(0)}$ is below partition $S_{Q,2}^{(1)}$. Each of partitions $S_{Q,2}^{(0)}$ includes a single row of four symbols.

The partitions of FIGS. 4b-4e enable the bit values of a symbol of a sixteen symbol QAM constellation to be determined. The 16 QAM constellation is used by way of an example. However the present invention can be applied to higher order constellations in a similar way.

Furthermore by letting $d_{I,K}$ and $d_{Q,K}$ denote half the distance between the partition boundaries B2 and B4 relative to bit $b_{I,K}$ and, $b_{Q,K}$ respectively, then for the 16 and 64 QAM constellations with Gray mapping used in IEEE802.11a and HIPERLAN/2, it can be shown that $$D_{I,K} \cong \begin{cases} y_I[i], & K = 1 \\ -|D_{I,K-1}| + d_{I,K}, & K > 1 \end{cases} \quad (8)$$

In terms of computational complexity the prior art system of decoding the symbols, even with all of the simplifications and approximations invoked, is computationally complex.

To illustrate this complexity, consider the case of a burst transmission. In a burst transmission the channel 18 can be assumed to be time-invariant for the duration of the burst. Thus channel state estimation need only be performed once by the receiver at the beginning of each burst.

If we denote $N_b$ the number of bits coded in the data burst and $N_{sd}$ the number of sub-carriers ($N_b >> N_{SD}$) then LLR calculation using the formulae:

$$LLR(b_{I,K}) = |G_{ch}(i)|^2 \cdot D_{I,K}$$

$$LLR(b_{Q,K}) = |G_{ch}(i)|^2 \cdot D_{Q,K} \quad (9)$$

requires one real multiplication per coded bit, plus computation of $N_{sd}$ squared modulus of complex values per physical data burst, which is equivalent to $2N_{sd}$ real multiplications.

Thus, the approximate LLR calculation requires ($N_b + 2N_{SD}$) real multiplications.

SUMMARY OF THE INVENTION

According to a first aspect of the present invention a measure of trust of data conveyed by a QAM symbol in a QAM process having at least 16 constellation points is estimated by calculating a linear function of the modulus of a channel state estimation.

It is thus possible to reduce the number of calculations, and in particular multiplications, performed in the soft output de-mapping by using an estimate of likelihood that is derived as a function of $|G_{CH}(i)|$, rather than $|G_{CH}(i)|^2$. Thus, the method significantly reduces the computational task of a receiver responsive to a QAM signal having at least 16 constellations points.

Preferably the estimate of trust for a bit $b_{I,K}$, for K=1, where K represents a bit index within a complex symbol, is calculated as $\Re\{r[i]e^{-j\phi ch(i)}\}$, where $\Re$ represents the "real" part of a complex number, r[i] is the received symbol in the $i_{th}$ sub-carrier, and $e^{-j\phi ch(i)}$ represents the reciprocal of the phase response of an $i_{th}$ transmission channel over which the symbol was transmitted.

Preferably the estimate of trust for a bit $b_{Q,K}$ is calculated as $\Im\{r[i]e^{-j\phi ch(i)}\}$ where $\Im$ represents the imaginary part of a complex number, for K=1.

Preferably the trust estimate of a bit $b_{I,K}$ is further calculated as $-|LLR(b_{I,K-1})|+(|G_{ch}(i)| \cdot d_{I,K})$ for K>1, where $G_{ch}(i)$ represents the channel frequency response complex coefficient on an $i_{th}$ channel and $d_{I,K}$ denotes the half distance between partition boundaries in QAM space, for K>1, and the estimate of trust of a bit $b_{Q,K}$ is calculated as $-|LLR(b_{Q,K-1})|+(|G_{ch}(i)| \cdot d_{Q,K})$ where $d_{Q,K}$ denotes the half distance between partition boundaries in QAM space, for K>1.

Preferably the estimate of trust is approximately a log-likelihood ratio (LLR).

According to a second aspect of the present invention, a measure of trust of data conveyed by a QAM symbol is estimated as a log-likelihood ratio (LLR), where the LLR ($b_{I,K}$) is calculated as $-|LLR(b_{I,K-1})|+(|G_{ch}(i)| \cdot d_{I,K})$ for K>1 where $G_{ch}(i)$ represents a channel frequency response complex coefficient on an $i_{th}$ channel and $d_{I,K}$ denotes a half distance between partition boundaries in QAM constellation, and where the LLR($b_{Q,K}$) is calculated as $-|LLR(b_{Q,K-1})| + (|G_{ch}(i)| \cdot d_{Q,K})$ for K>1 where $d_{Q,K}$ denotes the half distance between partition boundaries in QAM constellation, and K represents a bit index within the complex symbol.

The invention also relates to methods and apparatus for deriving the measures of trust, as well as a receiver for deriving an indication of bits in the symbols of the constellations.

BRIEF DESCRIPTION OF THE DRAWING

The present invention is now further described, by way of example only, with reference to the accompanying figures wherein.

DESCRIPTION OF THE PREFERRED EMBODIMENTS

Unlike single carrier systems in which all symbols are affected by the same signal to noise ratio (on average), a multi-carrier OFDM system of the type shown in FIG. 1 is such that each individual carrier suffers from an individual signal to noise ratio. However it is clear to the person skilled in the art that data conveyed on channels having a high signal to noise ratio is a priori more reliable than data transmitted on channels suffering from a low signal to noise ratio. This additional information has, in the prior art, been encoded by weighting the LLR functions by the square modulus of the channel frequency response, which represents the channel state information.

However the inventors have realised that using the modulus of the channel frequency response coefficients, instead of the square of the modulus, for calculating "soft bit" information for use by a decoder results in a soft bit approximation causing only a slight performance loss in terms of bit error rate at a given signal strength represented by $E_b/N_o$, where $E_b$ is the energy per information bit and $N_o$ is the power spectral density of the noise.

Approximating the soft bit information in this way results in a computationally efficient process and apparatus employing a one tap equaliser and an LLR calculation subsystem. Thus, the inventors have realised that sub-optimum soft input Viterbi decoding of a binary interleaved coded OFDM signal can be achieved with little additional complexity compared to performing the same operation using hard decoding.

By applying this approximation to the prior art scheme for calculating the LLRs, the following equations are obtained.

$$LLR(b_{I,K}) = \begin{cases} \mathcal{R}\{r[i]e^{-j\varphi ch(i)}\}, & K = 1 \\ -|LLR(b_{I,K-1})| + |G_{ch}(i)|\cdot d_{I,K} & K > 1 \end{cases} \quad (10a)$$

$$LLR(b_{Q,K}) = \begin{cases} \mathcal{I}\{r[i]e^{-j\varphi ch(i)}\}, & K = 1 \\ -|LLR(b_{Q,K-1})| + |G_{ch}(i)|\cdot d_{Q,K} & K > 1 \end{cases} \quad (10b)$$

Where $G_{ch}(i) = |G_{ch}(i)|e^{j\phi ch(i)}$

Similar results hold for other Gray labelling patterns different from that shown in FIG. 3.

Thus, compared with the prior art calculations of LLR, it can be seen that inside the LLR expression only the thresholds $d_{I,K}$ and $d_{Q,K}$ are scaled by the coefficients that convey the channel state information.

Figure 5:
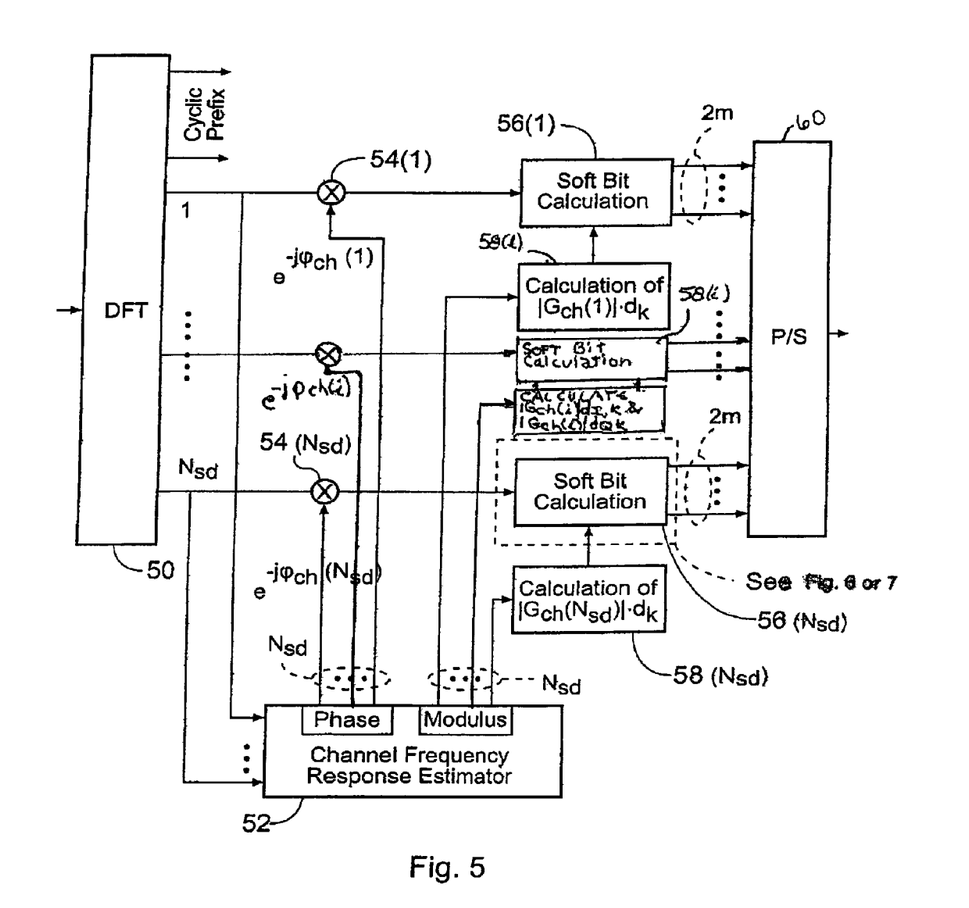
FIG. 5 is a block diagram of a channel state estimator and soft output QAM demapper in accordance with a preferred embodiment of the present invention.

As a consequence, the following process and apparatus can be adopted for joint OFDM signal equalisation and LLR computation. A block diagram of apparatus for performing the process is illustrated in FIG. 5.

Fourier transform block 50 converts the incoming OFDM signal from receiver 20 into individual data channels 1 to $N_{sd}$. Channels 1 to $N_{sd}$ respectively derive signals representing the components in frequency channels 1 ... $N_{sd}$ of the output of receiver 20. The output of block 50 for channel i represents an approximate value of a symbol of a particular QAM constellation that is applied to a processor arrangement including channel frequency response estimator 52, multiplier 54(i), soft bit calculator 56(i) and scalar calculator 58(i).

The processor arrangement initially equalises/corrects the phases of outputs of blocks 50. This is done by sending each one of the channels 1 to $N_{sd}$ derived by block 50 to an input of a channel frequency response estimator 52 which estimates the phase shift introduced by a link between transmitter 16 and receiver 20 of each one of the channels and thereby produces a phase correction signal $e^{-j\phi ch(i)}$ for each channel i, where i is an integer in the range $1 \leq i \leq N_{sd}$. Response estimator 52 performs a channel state estimate once per physical burst, at the beginning thereof.

The phase corrections that estimator 52 derives are applied to each of the channels via respective multipliers 54(1) to 54($N_{sd}$). The resulting phase equalised channel signals at the outputs of multipliers 54(1) to 54($N_{sd}$) are then supplied to first inputs of respective soft bit calculators 56(1) to 56($N_{sd}$) (illustrated in FIGS. 6 and 7 for 16 and 64 QAM constellations, respectively).

The channel frequency response estimator 52 also estimates the modulus of the signal strength in each one of the channels 1 to $N_{sd}$. Estimator 52 supplies the modulus estimate for each of channels 1 to $N_{sd}$ (i.e., $|G_{ch}(i)|$, where i is selectively 1 ... $N_{sd}$) to an associated threshold calculator 58(1) to 58($N_{sd}$) for each individual channel. Each of calculators 58(1) to 58($N_{sd}$) calculates the real and imaginary threshold values $|G_{ch}(i)| \cdot d_{I,K}$ and $|G_{ch}(i)| \cdot d_{Q,K}$, where i represents the channel number. Each of calculators 58(1) to 58($N_{sd}$) scales its input from estimator 52 by the predetermined stored value or values $d_k$ to derive its associated threshold value or values.

For a square QAM constellation having 16 symbols, each of which represents four bits, as illustrated in FIGS. 3 and 4, there is only one non-trivial boundary value in the I and Q directions associated with each symbol and the non-trivial boundary values are the same. For a square QAM constellation having 64 symbols, each of which represents six bits, there are two non-trivial boundary values ($d_1$ and $d_2$, where $d_1=2d_2$) in the I and Q directions associated with each symbol. Because the boundary values in the I and Q directions are the same for a symbol of a square QAM constellation having 16 symbols, calculator 58(i) derives a single output having a value $|G_{ch}(i)| \cdot d_1$. Because the boundary values in the I and Q directions for $d_1$ are the same and the boundary values in the I and Q directions for $d_2$ are the same and equal to $d_1/2$, calculator 58(i) derives first and second outputs respectively having values of $|G_{ch}(i)| \cdot d_1$ and $|G_{ch}(i)| \cdot d_2$ for a symbol of square QAM constellations having 64 symbols. Calculators 58(1) to 58($N_{sd}$) supply the threshold values to the respective soft bit calculators 56(1) to 56($N_{sd}$).

Each of soft bit calculators 56(1) to 56($N_{sd}$) derives the 2 m bit values respectively associated with each of the symbols 1 to $N_{sd}$ that block 50 derives. For the 16 QAM constellation, wherein m=2, as discussed and illustrated in connection with FIG. 3, each of calculators 56(1) to 56($N_{sd}$) derives 4 bits. For the 64 QAM constellation, wherein m=3, each of calculators 56(1) to 56($N_{sd}$) derives 6 bits. Calculators 56(1) to 56($N_{sd}$) supply the bits they derive to parallel to serial converter (P/S) 60 that derives a serial bit sequence for driving the input of bit de-interleaver 28.

Figure 6:
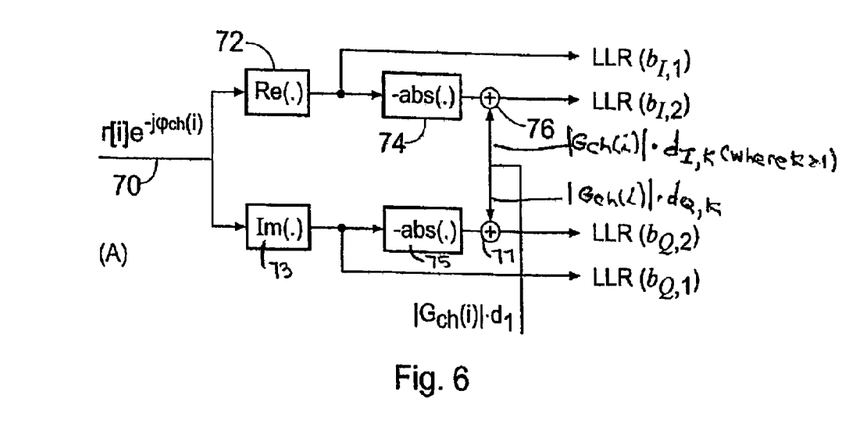
FIG. 6 is a block diagram of a soft decision block included in the soft bit calculator of FIG. 5 for a 16 QAM constellation.
Figure 7:
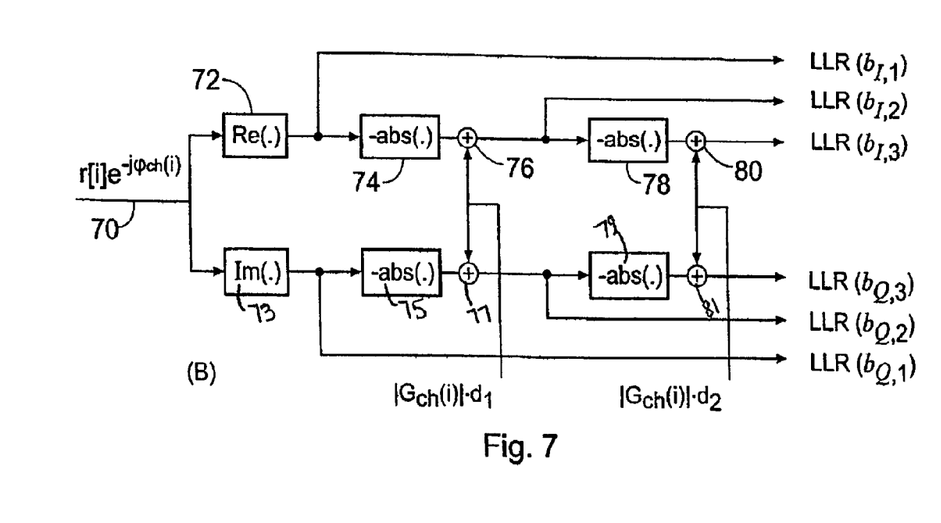
FIG. 7 is a block diagram of a soft decision block included in the soft bit calculator of FIG. 5 for a 64 QAM constellation.

The specific circuitry or computer processes included in each of the soft bit calculators 56(1) to 56($N_{sd}$) is shown in FIG. 6 for a 16 QAM constellation, and in FIG. 7 for a 64 QAM constellation.

For the 16 QAM constellation arrangement shown in FIG. 6 for soft bit calculation 56(i) (where i=1 ... $N_{sd}$), the phase equalised signal at the output of multiplier 54(i) is received at an input 70 and supplied to a first analyser 72 which calculates the real component ($\Re$) of the signal. The output of the first analyser 72 represents bit value LLR($b_{I,1}$), (i.e., the log-likelihood ratio of the first bit of the in-phase component of the QAM symbol, being processed) in accordance with the first line of Equation (10a). The value LLR($b_{I,1}$) is further passed through an absolute value former 74 which calculates and negates the absolute value of LLR($b_{I,1}$). Adder 76 adds the output of the absolute value former 74 to the in-phase threshold value $|G_{ch}(i)| \cdot d_I$ that threshold calculator 58($N_I$) derives to yield an output LLR($b_{I,2}$), in accordance with the second line of Equation (10a). Thus, the output of adder 76 represents the log-likelihood ratio of the second bit of the in-phase component of the QAM symbol being processed. A similar process is performed by analyzer 73 and absolute value former 75 on the imaginary component ($\Im$) of the signal from (1) multiplier 54(i) and (2) calculator 58(i) to yield LLR($b_{Q,1}$) and LLR($b_{Q,2}$) so that LLR($b_{Q,1}$) and LLR($b_{Q,2}$), i.e., the log likelihood ratios of the first and second bits of the quadrature phase component of the symbol, as respectively given by the first and second lines of equation (10b) are respectively derived at the outputs of analyser 73 and adder 77. Because the in-phase and quadrature boundaries are spaced from each other by the same amount, whereby $d_{I,K}=d_{Q,K}=d_1$, calculator 58(i) supplies a signal commensurate with $|G_{ch}(i)| \cdot d_1$ to both of adders 76 and 77. The four output soft bits of FIG. 6 are supplied to converter 60.

The arrangement shown in FIG. 7 for soft bit calculator 56(i) for the 64 symbol constellation is similar to that shown in FIG. 6 and like parts are denoted by like reference numerals. The additional circuitry or processes of FIG. 7 are that the outputs LLR($b_{I,2}$) and LLR($b_{Q,2}$) of adders 76 and 77 are respectively supplied to further absolute value former and negators 78 and 79. Negators 78 and 79 outputs that are added to threshold $|G_{ch}(i)| \cdot d_2$, as derived by threshold calculator 58(i), by further adders 80 and 81 to yield real and imaginary values LLR($b_{I,3}$) and LLR($b_{Q,3}$), respectively representing the log-likelihood ratios of the third bits of the in-phase and quadrature-phase components of the symbol. Thus, the outputs of adders 80 and 81 are respectively in accordance with the second lines of equations 10(a) and 10(b) for the third in-phase and quadrature phase bits of the processed symbol. The six output soft bits of FIG. 7 are supplied to converter 60.

Comparing the complexity of the apparatus of FIG. 5 in a burst mode with the prior art, the apparatus of FIG. 5 performs $N_{sd}$ real multiplications per transmission burst in the case of 16 QAM and 2$N_{sd}$ real multiplications for 64 QAM because only the thresholds $d_K$ need to be scaled by the channel state information coefficients.

However, these multiplications are not actual multiplications because for square QAM constellations (e.g. a 16 or 64 QAM), $d_K$ are powers of two; hence in fact only bit-wise shifts are needed for threshold scaling.

However, in order to calculate $N_{sd}$ moduli of the complex values per physical burst, it is necessary to calculate the channel state information values. This requires 2$N_{sd}$ real multiplications and $N_{sd}$ square roots to be formed.

Comparing the computational workload:

Arrangement of FIG. 5=2$N_{sd}$ real multiplications and $N_{sd}$ square roots.

Prior art=2 $N_{sd}$ real multiplications and $N_b$ real multiplications.

The computational advantage of the arrangement of FIG. 5 over the prior art occurs because $N_b \gg N_{sd}$ and in practice $N_{sd}$ is 48 in HIPERLAN/2 whereas $N_b$ is likely to be several thousand.

Figure 8:
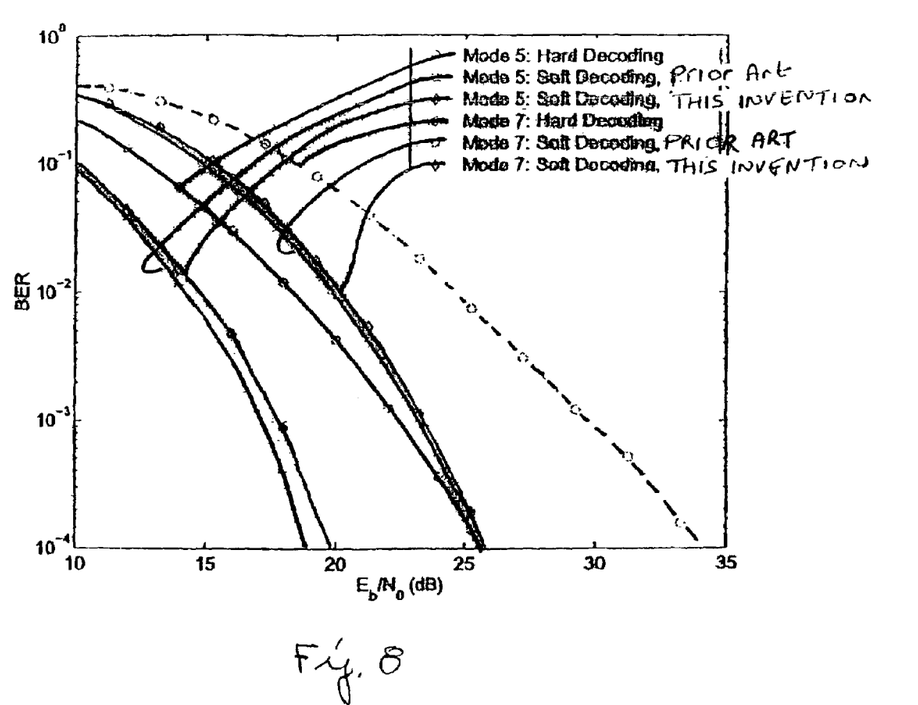
FIG. 8 is a comparison of decoding schemes, with the curves showing simulations for performance of a HIPERLAN/2 system.

The performance of the arrangement of FIG. 5 compared to the computationally complex prior art is shown in FIG. 8. For a given bit error rate the degradation in sensitivity is only a fraction of a dB for 16 QAM and is negligible for 64 QAM at BER $10^{-4}$. The approximation gets tighter for larger constellation size, where more calculations are saved by the approximate demapping. The graph of FIG. 8 compares hard decoding, prior art soft decoding and soft decoding according to the arrangement of FIG. 5 in modes 5 and 7 of HIPERLAN/2 using 16 and 64 QAM respectively.

It should be noted that, for simplicity, the specific embodiments of FIGS. 5-7 are described with respect to 16 QAM and 64 QAM, but it is to be understood that the principles of FIGS. 5-7 can be applied to larger constellations and similar demapping processes can be derived.

The invention claimed is:

1. A method of estimating and using a measure of trust of data conveyed by a QAM symbol in a channel of a QAM transmission process having at least 16 constellation points, comprising:

calculating the measure of trust as a linear function of the modulus of a channel state estimation and responding to the calculated measure of trust with a bit decoder to generate a received sequence of bits, wherein the measure of trust is a log-likelihood ratio (LLR), and where, for K=1, LLR($b_{I,K}$), is calculated in accordance with $\Re\{r[i]e^{-j\phi ch(i)}\}$ where LLR($b_{I,K}$) is the log-likelihood ratio of bit K of the in-phase component of a received symbol, $\Re$ represents the real part of a complex number, r[i] is the received symbol in channel $i_{ch}$, and $e^{-j\phi ch(i)}$ represents the reciprocal of the phase response of the $i_{th}$ transmission channel over which the received symbol was transmitted.

2. A method as claimed in claim 1, where LLR($b_{Q,K}$) is calculated as $\Im\{r[i]e^{-j\phi ch(i)}\}$, where LLR($b_{Q,K}$) is the log-likelihood ratio of bit K of a quadrature-phase component of the received symbol and $\Im$ represents the imaginary part of a complex number.

3. A method as claimed in claim 1, where, for K>1, LLR $(b_{I,K})$ is calculated as $-|\mathrm{LLR}(b_{I,K-1})|+(|G_{ch}(i)| \cdot d_{I,K})$ where $G_{ch}(i)$ represents the frequency response complex coefficient of channel $i_{th}$ and $d_{I,K}$ denotes the half distance between partition boundaries in a QAM constellation of the received symbol in the quadrature-phase direction.

4. A method as claimed in claim 3, for K>1, where LLR $(b_{Q,K})$ is calculated as $-|\mathrm{LLR}(b_{Q,K-1})|+(|G_{ch}(i)| \cdot d_{Q,K})$, where $G_{ch}(i)$ represents the frequency response complex coefficient of channel $i_{th}$ and $d_{Q,K}$ denotes the half distance between partition boundaries in a QAM constellation of the received symbol in the quadrature phase direction.

5. A method as claimed in claim 3 further comprising scaling the amplitude of $G_{ch}(i)$ by $d_{I,K}$.

6. A method as claimed in claim 5, further comprising using the modulus of $|G_{ch}(i)|$ as channel state information inside a soft output demapper.

7. A method as claimed in claim 1, wherein the QAM symbol is a symbol in an OFDM transmission process using multi-level modulation.

8. A method of estimating and using a measure of trust of data conveyed by a symbol of a channel of a QAM constellation, comprising the steps of:
   determining the measure of trust as a log-likelihood ratio (LLR) by calculating $\mathrm{LLR}(b_{I,K})$ where $\mathrm{LLR}(b_{I,K})$ is the log-likelihood ratio of the in-phase component of bit K of a received symbol and, for K>1, $(b_{I,K})$ is calculated as $-|\mathrm{LLR}(b_{I,K-1})|+(|G_{ch}(i)| \cdot d_{I,K})$ where $G_{ch}(i)$ represents a channel frequency response complex coefficient on an $i_{th}$ channel and $d_{I,k}$ denotes the half distance between partition boundaries in a QAM constellation of the received symbol in the in-phase direction and calculating $\mathrm{LLR}(b_{Q,K})$ where $\mathrm{LLR}(b_{Q,K})$ is the log-likelihood ratio of the quadrature-phase component of bit K of the received symbol and, for K>1, calculating $\mathrm{LLR}(b_{Q,K})$ as $-|\mathrm{LLR}(b_{Q,K-1})|+(|G_{ch}[i]| \cdot d_{Q,K})$ where $d_{Q,K}$ denotes the half distance between partition boundaries in the QAM constellation of the received symbol in the quadrature phase direction, and
   responding to the calculated measure of trust with a bit decoder to generate a received sequence of bits.

9. A method as claimed in claim 8, wherein, for K=1, $\mathrm{LLR}(b_{I,K})$ is calculated in accordance with $\Re\{r[i]e^{-j\phi ch(i)}\}$, where $\Re$ represents the real part of a complex number, $r[i]$ is the received symbol in channel $i_{ch}$, and $e^{-j\phi ch(i)}$ represents the reciprocal of the phase response of the $i_{th}$ transmission channel over which the received symbol was transmitted, and wherein, for K=1, the $\mathrm{LLR}(b_{Q,K})$ is calculated as $\Im\{r[i]e^{-j\phi ch(i)}\}$, where $\Im$ represents the imaginary part of a complex number.

10. A method as claimed in claim 8, wherein the amplitude of $G_{ch}(i)$ is scaled by $d_{I,K}$ and $d_{Q,K}$.

11. A method as claimed in claim 10, further comprising using the modulus of $|G_{ch}(i)|$, as channel state information inside a soft output demapper.

12. A soft output demapper operating in accordance with the method of claim 1.

13. A receiver for a QAM signal having at least 16 constellation points, the receiver including the soft output demapper of claim 12.

14. A soft output demapper for demapping a QAM signal having at least 16 constellation points, comprising:
   an arrangement for calculating a log-likelihood ratio (LLR) by calculating $\mathrm{LLR}(b_{I,K})$, where $\mathrm{LLR}(b_{I,K})$ is the log-likelihood ratio of the in-phase component of bit K of a received symbol and, for K>1, $\mathrm{LLR}(b_{I,K})$ is calculated as $-|\mathrm{LLR}(b_{I,K-1})|+(|G_{ch}(i)| \cdot d_{I,K})$ where $G_{ch}(i)$ represents a channel frequency response complex coefficient on an $i_{th}$ channel and $d_{I,K}$ denotes the half distance between partition boundaries in a QAM constellation of the received symbol in the in-phase direction and calculating $\mathrm{LLR}(b_{Q,K})$ where $\mathrm{LLR}(b_{Q,K})$ is the log-likelihood ratio of the quadrature-phase component of bit K of the received symbol and, for K>1, calculating $\mathrm{LLR}(b_{Q,K})$ as $-|\mathrm{LLR}(b_{Q,K-1})|+(|G_{ch}[i]| \cdot d_{Q,K})$ where $d_{Q,K}$ denotes the half distance between partition boundaries in the QAM constellation of the received symbol in the quadrature phase direction.

15. A receiver for a QAM signal having at least 16 constellation points, the receiver including the soft output demapper of claim 14.

16. A receiver for a QAM signal including sequential QAM constellations having at least 16 constellation points, comprising:
   an arrangement for determining a measure of trust as a log likelihood ratio(LLR) as (a) the first bit of a particular symbol in the in-phase direction, $\mathrm{LLR}b_{I,1}$, from $-\Re\{r[i]e^{-j\phi ch(i)}\}$, (b) the first bit of the particular symbol in the quadrature phase direction, $\mathrm{LLR}(b_{Q,1})$, from $\Im\{r[i]e^{-j\phi ch(i)}\}$, (c) any bit K>1 in the in-phase direction from $-|\mathrm{LLR}(b_{I,K-1})|+(|G_{ch}(i)| \cdot dI_{,K})$, and (d) any bit K>1 in the quadrature phase direction from $-|\mathrm{LLR}(b_{Q,K-1})|+(|Gch(i)| \cdot d_{Q,K})$, where $d_{I,K}$ denotes the half distance between partition boundaries in the in-phase direction of the QAM constellation of the particular symbol, $d_{Q,K}$ denotes the half distance between partition boundaries in the quadrature direction of the QAM constellation of the particular symbol, $\Re$ represents the real part of a complex number, $\Im$ represents the imaginary part of a complex number, $r[i]$ represents the particular symbol in channel $i_{ch}$, and $e^{-j\phi ch(i)}$ represents the reciprocal of the phase response of the $i_{th}$ transmission channel over which the particular symbol was transmitted to the receiver.

* * * * *